United States Patent [19]
Macdonald et al.

[11] Patent Number: 6,006,235
[45] Date of Patent: Dec. 21, 1999

[54] METHOD AND APPARATUS FOR INVOKING A STORED PROCEDURE OR A USER DEFINED INTERPRETED LANGUAGE FUNCTION IN A DATABASE MANAGEMENT SYSTEM

[75] Inventors: Patrick E. Macdonald, Etobicoke; Frank C. Eigler, Toronto, both of Canada

[73] Assignee: International Business Machines Corporation, Armonk, N.Y.

[21] Appl. No.: 08/978,588

[22] Filed: Nov. 26, 1997

[51] Int. Cl.$^6$ ..................................................... G06F 17/30
[52] U.S. Cl. ........................ 707/103; 707/103; 707/104; 707/206
[58] Field of Search .................... 707/103, 104, 707/206

[56] References Cited

U.S. PATENT DOCUMENTS

| | | | |
|---|---|---|---|
| 4,949,255 | 8/1990 | Gerth et al. | 364/200 |
| 5,210,876 | 5/1993 | Uchida | 395/700 |
| 5,675,804 | 10/1997 | Sidik et al. | 395/705 |
| 5,787,300 | 7/1998 | Wijaya | 395/800.01 |
| 5,923,878 | 7/1999 | Marsland | 395/704 |

OTHER PUBLICATIONS

"2.1 Interpreters and Compilers", http://www.sc/wustl.edu/~plezbert/contcom/thesis/node6.html, pp. 1–2, Jul. 22, 1999.

"Common Compiler and Interpreter Problems", http://ccpc5.unican.es/manuales/java/tutorial/getStarted/problems/index.html, pp. 1–3, Jul. 22, 1999.

*Primary Examiner*—Thomas G. Black
*Assistant Examiner*—William Trinh
*Attorney, Agent, or Firm*—Ohlandt, Greeley, Ruggiero & Perle

[57] ABSTRACT

The invention herein provides method, means and programming for invoking a stored procedure or user defined function in an interpreted language such as Java in a database management system capable of operating on a data processing system. The invention includes a database server associated with invocation means adapted to receive a request for invokation of a stored procedure or user defined function in a specified interpreted language, such as Java. The invocation means is adapted to: load an interpreter for the specified language if the server is not already loaded, and setup an interprocess communication between the interpreter and the data the database server. The invocation means is adapted to return an error message to an application calling for invocation of the stored procedure or user defined function, without otherwise impeding operation of the database server.

16 Claims, 3 Drawing Sheets

METHOD AND APPARATUS FOR INVOKING A STORED PROCEDURE OR A USER DEFINED INTERPRETED LANGUAGE FUNCTION IN A DATABASE MANAGEMENT SYSTEM

FIELD OF THE INVENTION

This invention relates to methods and apparatus for using stored procedures or other predefined functional routines, such as routines written in Java code as software functions to be called by or used in conjunction with the operation of a database management system adapted to operate on a data processing system such as a computer.

BACKGROUND OF THE INVENTION

The main application of a database management system is of course to manage the storage, arrangement, and retrieval of data; however, in order to provide a variety of capabilities to the management system it is desirable to used stored procedures or predefined functions upon which the database management system can call to accomplish functions provided by these stored procedures.

The Java programming language provides a convenient language for the development of predefined functions, such as stored procedures. Java is known as an interpreted language, in that it must be interpreted (ie. translated and executed statement by statement) by the computer system on which it is run in order to be used. As is well known in the art an interpreter program may be used to translate and then execute each statement in the procedures or functions encoded in the programming language. For the Java programming language a suitable Java Interpreter would be used.

It is convenient to store executable routines such as the Java functions or procedures in a dynamic-link library (DLL) file or files. More than one function can be included in a DLL file. In the OS/2 or Windows operating systems these files typically have DLL extensions. These files are loaded only when needed by the program that calls them.

For increased speed in suitable instances functions encoded in the Java language can be compiled on the fly as compiled routines typically operate faster than corresponding interpreted routines.

There are a number of potential problems associated with using stored procedures in interpreted languages with another application such as a database management system that makes use of them.

In order to minimize facility usage such as memory it is preferable that the database system loads the required interpreter into its address space without crashing if the interpreter does not exist on the platform being addressed. It is important to determine whether a specified executable routine exists before calling it to prevent undesirable failures.

In the case of Java, which operates autonomously, there must be enough threads available for the tasks at hand but they should be reduced to a small number at other times.

One of the features of Java programming is the automatic collection of garbage objects, ie. processes or functions that are not used or have not been used for specified periods of time. This can pose a problem in database management applications where a Java object may not be called on frequently. There is a need for a long-lived Java object in certain circumstances.

Another difficulty with using Java encoded stored procedures is the difficulty in providing multiple output arguments from stored procedures.

While it is desirable to gain the advantages of Java routines there should be little or no overhead added for calling stored procedures in other languages.

SUMMARY OF THE INVENTION

The Invention herein seeks to provide the advantages and overcome the difficulties indicated above as described below.

The invention provides method and means for invoking a stored procedure or user defined function in a database management system capable of operating on a data processing system comprising:

a database server being associated with invocation means adapted to receive a request for invocation of a stored procedure or user defined function in a specified interpreted language.

The invocation means is adapted to:

load an interpreter for the specified language if the server is not already loaded, and setup an interprocess communication between the interpreter and the data the database server. The invocation means is preferably adapted to return an error message to an application calling for invocation of the stored procedure or user defined function, without otherwise impeding operation of the database server.

Preferably the invocation means is adapted to bad a stored procedure library as if it were a library in a default programming language and run the stored procedure if it were found in the library, and otherwise read the stored procedure system catalogue of the database management system to determine the language of the stored procedure it loads the appropriate interpreter for the specified interpreted language of the stored procedure if the interpreter was not already loaded;

and if the interpreter fails to load properly, returning a predefined error code to the application calling for the stored procedure. When the interpreter is loaded, it sets up interprocess communication between the interpreter and the database server.

Preferably the interpreter is loaded by means of a stub dynamic link library which returns a predefined error code to the application calling for the stored procedure.

Preferably the interprocess communication between the interpreter and the database server is accomplished by thread scheduling means adapted for:

scheduling an appropriate worker thread for the interpreted language;

if no threads exist creating an immortal thread;

if one or more threads exist locating an idle thread from a pool of threads;

if unable to locate an idle thread in a predetermined length of time then creating a mortal thread; and, processing means adapted to use the thread to determine the appropriate method function to call based on predefined attributes such as class, method name, or signature.

DESCRIPTION OF THE PREFERRED EMBODIMENT

Figure 1A:
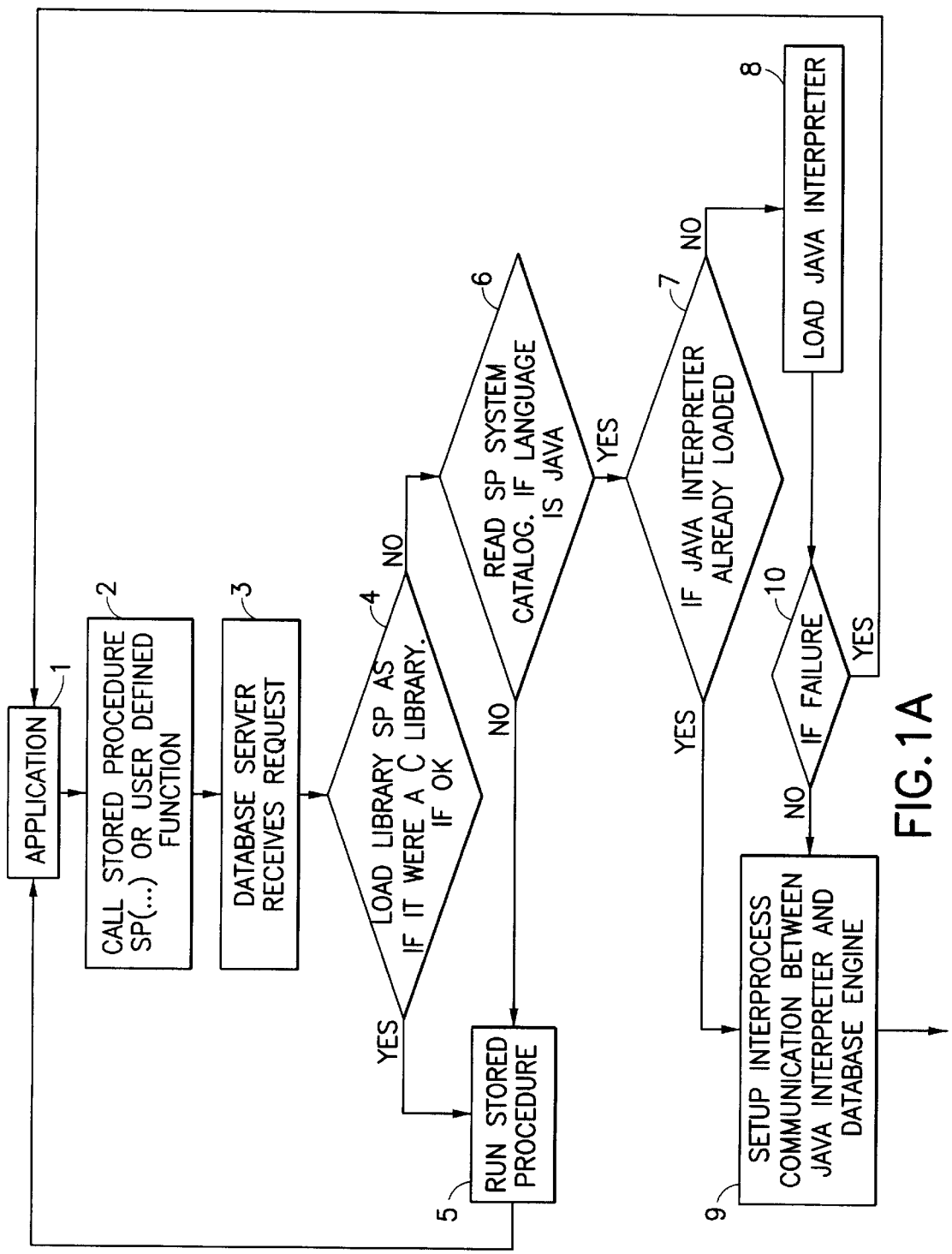
FIGS. 1A–1C depict a flow chart of the process of the specific embodiment of the invention described below.

The specific embodiment of the invention is described below in the context of the Java programming language, although it will be realized by those skilled in the art that other programming languages such as C++, Smalltalk, or others may be used and take advantage of one or more features of the present invention.

Java Interpreter Loading and Startup

Frequently in the construction of a data processing system using the Java programming language the code for a Java interpreter usually resides in a shared library (also known as a Dynamic-Link Library or DLL). In the case of a database management system server (the database engine) if the database engine processes were to be linked against such a shared library, but the interpreter was not installed properly, the database engine processes would not be able to start. Since in many instances it may be preferable to rely on an off-the-shelf Java interpreter package (instead of a custom modified one), the option of statically linking the entire Java system into one executable (which would require the presence of the Java system before the database engine could be started) is not available.

Instead of such linking, in the preferred implementation we rely on a small stub dynamic link library (DLL), that is loaded at run time at the first Java UDF/STP request, using database engine internal calls. It is this stub that is linked with the Java interpreter dynamic link library (DLL). If the interpreter is not installed, the run-time loading of the stub will fail, but this failure is caught by the database engine and handled gracefully by sending an error code to the application that invoked the UDF function in the database engine. In particular, as an advantage of this approach, all other database functions remain available. In addition, to detect the unlikely case of a partial Java installation, we use an initial rendez-vous (this is similar to pinging a server to tell if it is active) protocol to confirm that the embedded interpreter is brought up.

Communication with Java Interpreter

Currently the only means of inter-process communication in Java is to employ TCP/IP sockets and files. These are too slow for repeated Java UDF invocations. Instead of using these built-in methods, it is preferable to enable the Java interpreter to use the communication methods provided by the database runtime environment.

One database engine message queue can be used per Java interpreter instance to send STP/UDF invocation requests. This queue may be written to by any of the database agent threads. To signal a completion, a per-agent semaphore (identified in the message) is set. Results are written into shared memory, and error result codes are sent with the semaphore.

The term "threads" will be appreciated by those skilled the art. A thread is a process that is part of a larger process or program.

To bootstrap the Java interpreter, the location of the message queue is passed as a "command line argument". In this manner no new static variables are required for this purpose.

Little or No Overhead for Non-Java UDFs/STPs

For database management systems it is important to maintain the performance of trusted User Defined Function and Stored Procedure performance levels that are the same as at pre-Java levels, due to their use in benchmarks. Therefore, before a particular STP invocation is made a default program operation control flow is followed. For instance, for a trusted function invocation which is typically written in the C language the C language DLL will be first invoked for trusted use. Only if that doesn't work, is a (longer), Java-spefic procedure used to test for and execute a Java STP (trusted or untrusted). For UDFs, the language is known in advance from the system catalogues, so no ambiguity needs to be worked around, and then if the language is Java the Java interpreter can be loaded if it is not already loaded.

Scheduling Java Worker Threads

Since Java threads run autonomously, each STP/UDF request has to be assigned to some other thread than the database engine agent causing the request. This assignment should preferably be flexible and dynamic because many users could issue long and short term STP/UDF calls at the same time. Yet the assignment of one Java thread per database engine agent thread is too wasteful, because unused threads take up system resources.

It is preferable to use a dynamic pool of worker threads in Java. They spawn new worker threads when they detect a high load on the Java interpreter, and they die off after a period of non-use. The algorithm performed by the Java INTERPRETER is:

Start one worker thread.

Mark it "immortal" so that it will never die off.

This is done so that it is only necessary to bring up the Java interpreter once to constrain overhead as the normal operation of Java programming would result in unused threads being destroyed prematurely.

In the preferred embodiment each worker thread follows the following algorithm, and uses only one shared integer counter to synchronize WITH THE INTERPRETER Settings.

---

Begin loop.
    Increment the count of idle worker threads.
    Wait for an STP/UDF invocation request (with a timeout).
    Decrement the count of idle worker threads.!
    If a request arrived before the timeout, and the number of idle
      worker threads is zero,
    Start a new worker thread.
    Do not mark it "immortal".
    If instead the wait timed out, and this thread is not immortal, and
      the idle worker count is greater than zero,
    Exit the loop.
    If a request arrived before the timeout, execute the request.
    Go to top of the loop.
Die off-stop this worker thread.

---

Dynamic Invocation of Java Methods

Java is a typesafe language which is beneficial. Database management systems were not previously coded in Java, therefore, in these situations input arguments need to be mapped to Java UDFs and STPs from the complex and unsafe pointer/length/buffer system used by the database engine internally to the cleaner Java data types. These values can be safely manipulated in Java, without worry about corrupting the database engine internals.

One concern is the richness of SQL DATA types that may be passed to a UDF/STP. There are more than 10 data types in the SQL language. In order to call a Java method symbolically, that is, by name only, we have to uniquely identify it in its class. This is made complicated because Java allows method overloading—the practice of reusing method names with different argument lists to denote different method bodies.

Due to overloading, Java uses a triple (class, method name, signature) to identify a method body. The signature is a string identifying all input argument and return value types. We therefore compute a method signature for each invocation from the actual data types passed from the database engine. For example, a UDF taking an SQL INTEGER and a VARCHAR(20) and returning a BLOB(20K) (these are standard SQL data types and need not be explained in any more depth) would map to the signature "(Ljava/lang/Integer;Ljava/lang/String;)[b". A Java method declared "byte method(integer, String)" would have this signature.

In the preferred embodiment there is only one family of functions exported by the Java interpreter for calling Java methods by name. It is a C routine that takes C-style "varargs" (This is the standard C calling convention) for the input arguments themselves. Since we must support arbitrary permutations of argument types, all values are converted into first-class Java object handles, which have equal size and can portably be passed to one "varargs" call.

We therefore compute both the signature string, and the matching vector of Java objects that we can pass with confidence to the named Java method. Only a method that accepts the exact types we instantiate could be invoked.

The Java return type of a UDF, or the multiple "out parameters" of an STP, are type/range checked. Simply, SQL NULL values are represented by Java nulls.

Existence Testing of Java Methods

Various versions of the Java interpreter don't handle errors well for the symbolic method calls above. If the user declares a Java UDF/STP for which no matching Java method actually exists, the interpreter could fail, causing a crash. (This sort of error could not happen for pure Java programs. The compiler and the interpreter enforce the presence of matching methods for pure Java applications. The dynamic method call function is not so well protected.)

An explicit check for the existence of a Java method with given class/name/signature. This check traverses internal Java interpreter data structures to confirm that a method exists with the proper access protection flags and signature. A successful result from the check code virtually ensures that the subsequent dynamic method call function will not fail from being absent.

Protection of Java Objects from Garbage Collection

For one type of UDF call, those declared with the "scratchpad" option, a single Java object is instantiated. It is intended to be reused for multiple UDF invocations, once for each row in a query. Since these invocations come separately, with an indefinite time interval between them, there is a risk of premature garbage collection by the Java interpreter. This is because no reference remains to the to-be-reused Java object after a worker thread handles one request. A garbage collection cycle between invocations could remove that UDF object.

To prevent this, a hash table, shared between all worker threads, is used to store the UDF object between calls. The key for locating the UDF object is a unique serial number. The serial number is stored in the database-provided scratchpad. The hash table entry is cleared after the UDF invocation received its last call.

Multiple Output Arguments from STPs

In order to allow a Java stored procedure to return multiple return values, an additional dummy argument is passed to the Java method. It is an object of a provided type, that contains in it an opaque (This means the Java method is passed an additional argument for which the method does not refer to directly. It simply ignores it) integer that points at the "SQLDA" structure from which the database input/output arguments came.

Given this object, a Java STP method may make calls on it to set one output argument at a time. Methods like "set Integer(n,v)" allow the n-th output argument to be set to the Integer value v. Other functions allow argument slots of other types to be set—each is type and length checked.

Figure 1B:
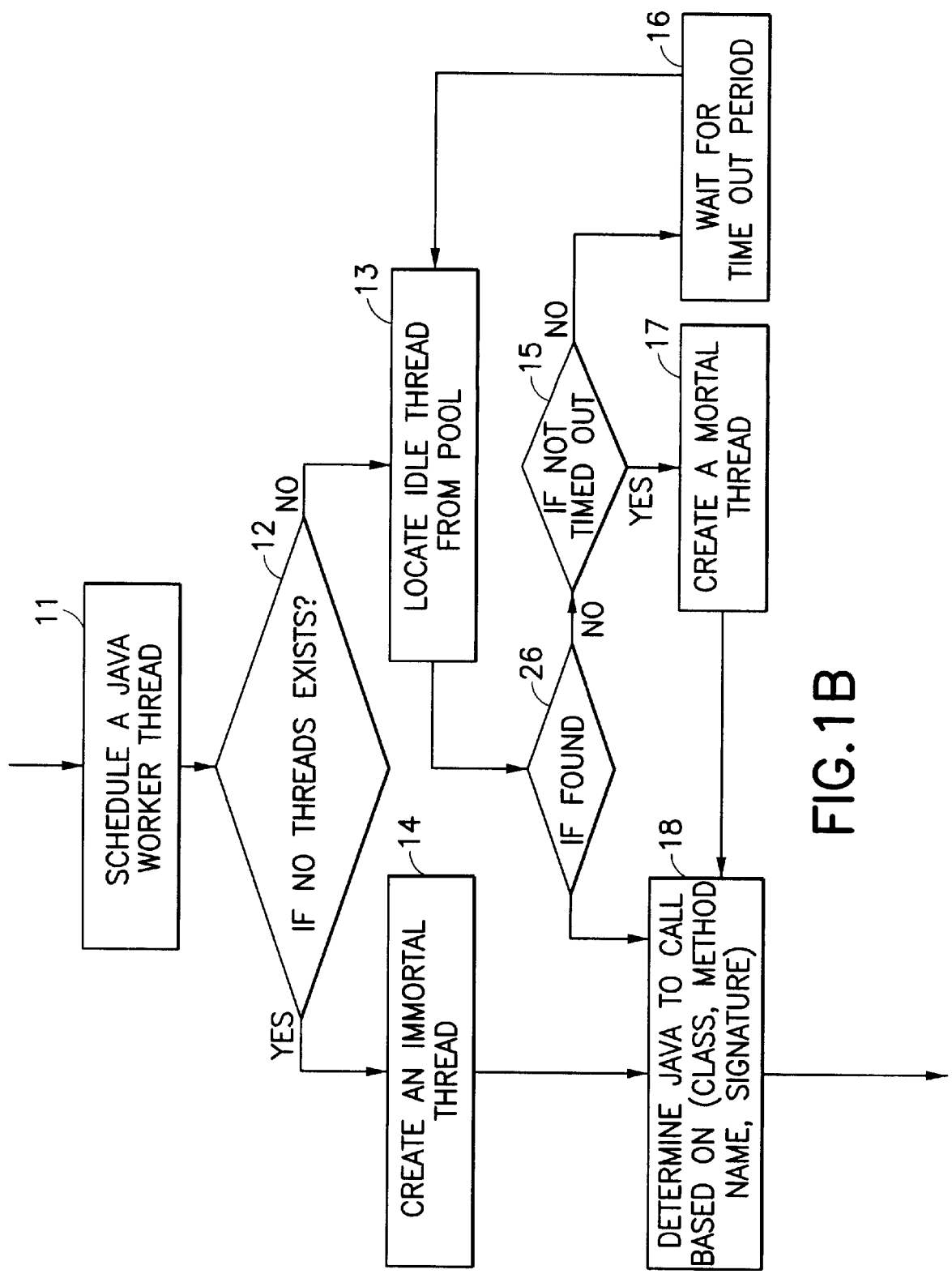
Figure 1C:
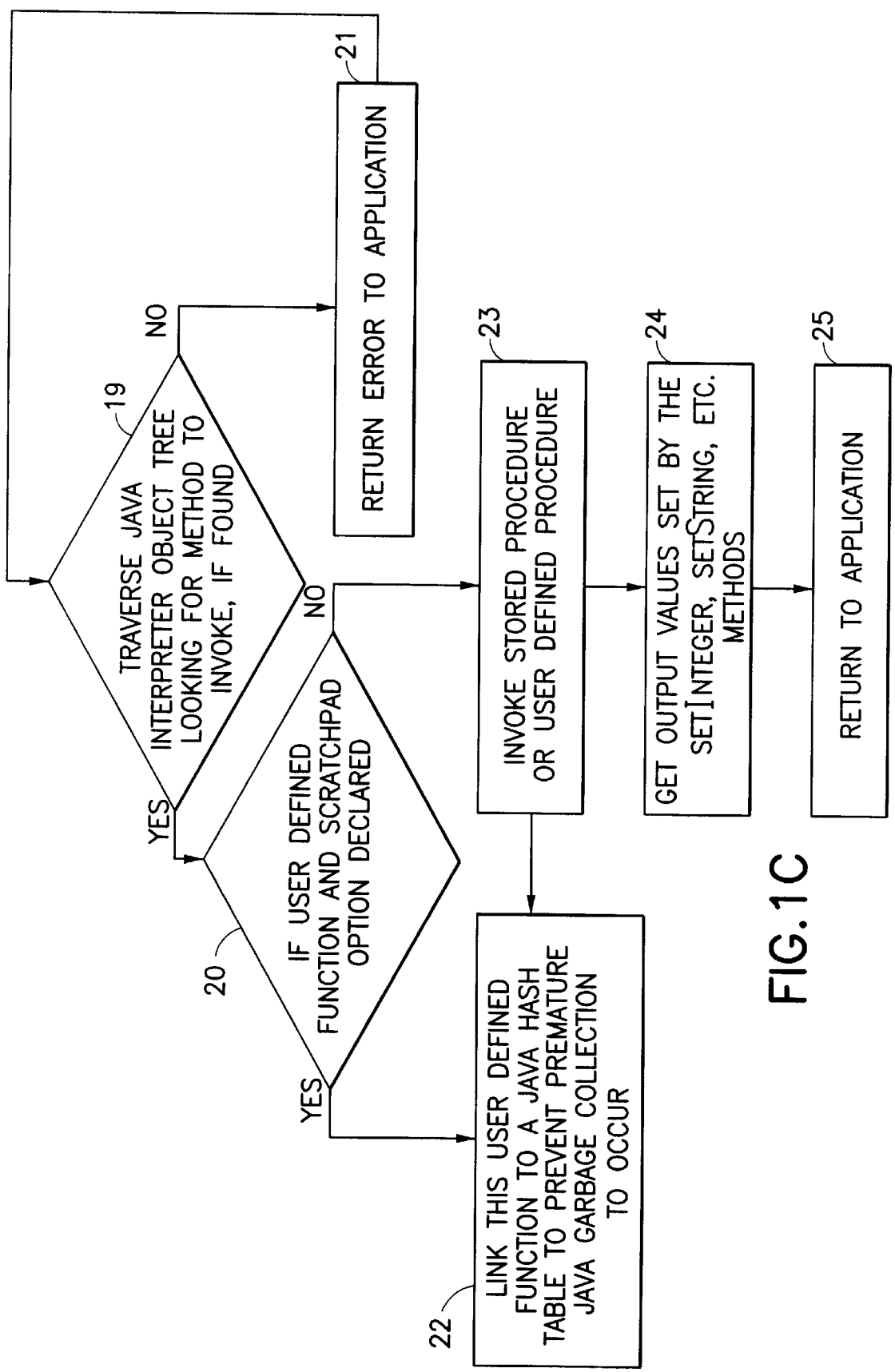

Referring to the flow chart of FIGS. 1A–1C which depict the preferred embodiment of the invention a more thorough understanding of the invention can be gleaned.

1, application software, such as present in the client of a client server network makes a call, 2, to a Stored Procedure or User Defined Function which is received, 3, by the database server. In the case of a call for a stored procedure it, 4, loads the stored procedure library as if it were a C library (presuming the C language is the usual programming language used by the database system).

5, if the stored procedure is present in the C library the stored procedure called is run. If it is not then the stored procedure system catalogue is read, 6, and if the language for the stored procedure is found to be Java the Java Interpreter is loaded, 8, if it is not already loaded. 7, if it is found to be already loaded then, 9, an interprocess communication is setup between the Java Interpreter and the database engine. If the loading of the Java Interpreter under step 8 fails a failure return code is returned to the application calling for the stored procedure. Otherwise the interprocess communication is setup as aforesaid. The use of a stub DLL as described above facilitates the handling of the loading of the Java Interpreter.

11, to setup the interprocess communication a Java worker thread is scheduled. If no threads exist then an immortal thread is created (see steps 12, and 14). 13, if a thread exists then an idle thread is attempted to be located from a pool of threads. If a thread is found within a predefined length of time then, 18, the Java method to be called is determined based on the best match of the following: class, method name, and signature. If an idle thread is not located within the predefined timeout period then a mortal thread is created (see steps 14, 15, 16, and 17). Then this mortal thread is used as previously to determine the Java method to be called. Referring to step 19 the object tree of the Java Interpreter is traversed searching for the method to invoke. If the method is not found then an error message is returned, 21, to the calling application. If the method is found and it is a user defined function with the scratchpad option declared then this UDF is linked to a Java Hash table to prevent garbage collection from occurring (see steps 20, 22), then it is invoked. If it is a stored procedure or user defined procedure then it is invoked (see step 23, 24) with the result being returned, 25, to the calling application.

As will be well appreciated the preferred embodiment of the invention may be preferably accomplished in the form of a computer program in which the various functions are accomplished by routines adapted for those purposes. The program may be stored and transferred on a suitable storage medium such as a disk, or tape and may be used to program a data processing system such as a general purpose computer to operate the data base system of the specific embodiment of the invention.

While we have described the preferred embodiment of the invention as aforesaid, those skilled in the art will appreciate that variations in the steps indicated or the languages employed can be made without departing from the spirit and scope of the invention.

The embodiments of the invention in which an exclusive property or privilege is claimed are defined as follows:

1. Means for invoking a stored procedure or user defined function in a database management system capable of operating on a data processing system comprising:

a database server being associated with invocation means adapted to receive a request for invocation of a stored procedure or user defined function in a specified interpreted language;

said invocation means being adapted to:

load an interpreter for said specified language if said server is not already loaded, and setup an interprocess communication between said interpreter and said database server;

said invocation means being adapted to return an error message to an application calling for invocation of said stored procedure or user defined function, without otherwise impeding operation of said database server;

wherein said invocation means is adapted to load a stored procedure library as if it were a library in a default programming language and run said stored procedure if it were found in said library, and otherwise read the stored procedure system catalogue of the database management system to determine the language of said stored procedure, and load the appropriate interpreter for the specified interpreted language of the stored procedure if said interpreter was not already loaded;

and if said interpreter fails to load properly, returning a predefined error code to the application calling for said stored procedure;

and when said interpreter is loaded, setup interprocess communication between said interpreter and said database server.

2. The means of claim 1 wherein said interpreter is loaded by means of a stub dynamic link library which returns a predefined error code to the application calling for said stored procedure.

3. The means of claim 2 wherein said interprocess communication between said interpreter and said database server is accomplished by:

thread scheduling means adapted for:
scheduling an appropriate worker thread for said interpreted language;
if no threads exist creating an immortal thread;
if one or more threads exist locating an idle thread from a pool of threads;
if unable to locate an idle thread in a predetermined length of time then creating a mortal thread;
and, processing means adapted to use said thread to determine the appropriate method function to call based on predefined attributes such as class, method name, or signature.

4. The means of claim 3 wherein said method function to call is identified by traversing the interpreter to find the best match for said method.

5. The means of claim 4 wherein said method function to call is identified by traversing the object tree of said interpreter to locate the best matching method function based on said predefined attributes, and;

if not found returns an error code to said application;
and if found invokes the appropriate stored procedure of user defined procedure.

6. The means of claim 5 wherein for the case wherein said method function comprises a user defined function with a scratchpad option declared providing means for linking said user defined function to a suitable Hash table to prevent premature garbage collection.

7. The means of claim 1 wherein said interpreted language is Java and said interpreter is a Java interpreter.

8. A computer program product comprising:
a computer usable medium having computer readable program code means embodied therein for invoking a stored procedure or user defined function in a database management system capable of operating on a data processing system said computer readable program code means in said computer program product comprising:

computer readable program code means for causing a computer to effect a database server associated with invocation means adapted to receive a request for invocation of a stored procedure or user defined function in a specified interpreted language;

said invocation means being adapted to:
load an interpreter for said specified language if said server is not already loaded, and setup an interprocess communication between said interpreter and said database server;

said invocation means being adapted to return an error message to an application calling for invocation of said stored procedure or user defined function, without otherwise impeding operation of said database server; and wherein said invocation means is adapted to load a stored procedure library as if it were a library in a default programming language and run said stored procedure if it were found in said library, and otherwise read the stored procedure system catalogue of the database management system to determine the language of said stored procedure, and load the appropriate interpreter for the specified interpreted language of the stored procedure if said interpreter was not already loaded;

and if said interpreter fails to load properly, returning a predefined error code to the application calling for said stored procedure;

and when said interpreter is loaded, setup interprocess communication between said interpreter and said database server.

9. The computer program product of claim 8 wherein said interpreter is loaded by means of a stub dynamic link library which returns a predefined error code to the application calling for said stored procedure.

10. The computer program product of claim 9 wherein said interprocess communication between said interpreter and said database server is accomplished by:

thread scheduling means adapted for:
scheduling an appropriate worker thread for said interpreted language;
if no threads exist creating an immortal thread;
if one or more threads exist locating an idle thread from a pool of threads;
if unable to locate an idle thread in a predetermined length of time then creating a mortal thread;
and, processing means adapted to use said thread to determine the appropriate method function to call based on predefined attributes such as class, method name, or signature.

11. The computer program product of claim 10 wherein said method function to call is identified by traversing the interpreter to find the best match for said method.

12. The computer program product of claim 11 wherein said method function to call is identified by traversing the object tree of said interpreter to locate the best matching method function based on said predefined attributes, and;

if not found returns an error code to said application;
and if found invokes the appropriate stored procedure of user defined procedure.

13. The computer program product of claim 12 wherein for the case wherein said method function comprises a user defined function with a scratchpad option declared providing means for linking said user defined function to a suitable Hash table to prevent premature garbage collection.

14. The computer program product of claim 8 wherein said interpreted language is Java and said interpreter is a Java interpreter.

15. A method for invoking a stored procedure or user defined function in a database management system capable of operating on a data processing system comprising:

associating a database server with invocation means adapted to receive a request for invocation of a stored procedure or user defined function in a specified interpreted language;

said invocation means being adapted to:

load an interpreter for said specified language if said server is not already loaded, and setup an interprocess communication between said interpreter and said database server;

said invocation means being adapted to return an error message to an application calling for invocation of said stored procedure or user defined function, without otherwise impeding operation of said database server; and wherein said invocation means is adapted to load a stored procedure library as if it were a library in a default programming language and run said stored procedure if it were found in said library, and otherwise read the stored procedure system catalogue of the database management system to determine the language of said stored procedure, and load the appropriate interpreter for the specified interpreted language of the stored procedure if said interpreter was not already loaded;

and if said interpreter fails to load properly, returning a predefined error code to the application calling for said stored procedure;

and when said interpreter is loaded, setup interprocess communication between said interpreter and said database server.

16. The method of claim 15 wherein said interpreter is loaded by means of a stub dynamic link library which returns a predefined error code to the application calling for said stored procedure.

* * * * *